July 19, 1966 R. HOLT 3,261,249
WEB CUTTING ASSEMBLY WITH ROTATING CUTTING BLADE
Filed Oct. 14, 1963
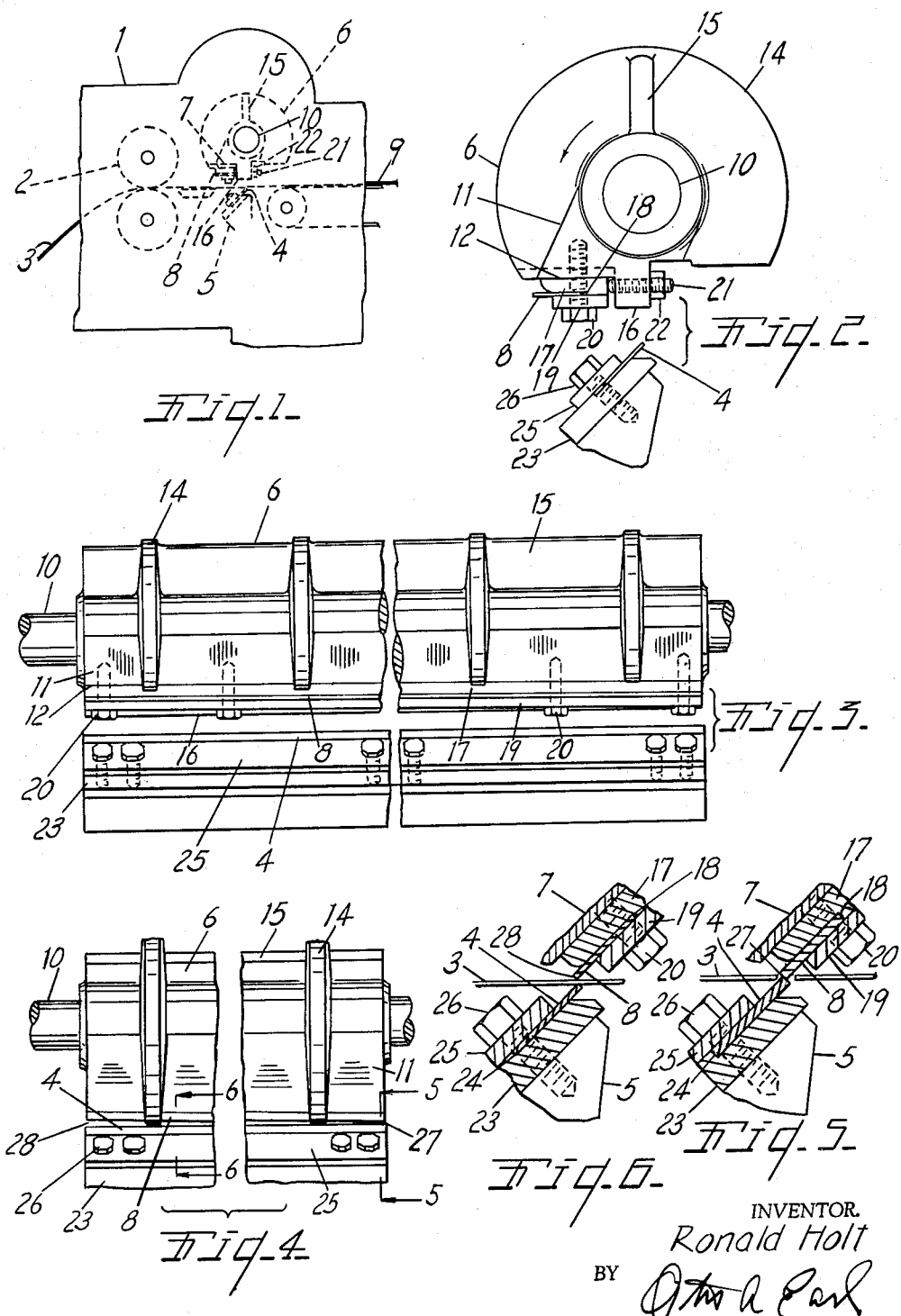
INVENTOR.
Ronald Holt
BY
ATTORNEY

United States Patent Office 3,261,249
Patented July 19, 1966

3,261,249
WEB CUTTING ASSEMBLY WITH ROTATING CUTTING BLADE
Ronald Holt, Battle Creek, Mich., assignor to Battle Creek Packaging Machines, Inc., Battle Creek, Mich.
Filed Oct. 14, 1963, Ser. No. 316,050
11 Claims. (Cl. 83—341)

This invention relates to improvements in web cutting assembly with rotating cutting blade. The principal objects of this invention are:

First, to provide a blade and blade mount for a rotating cutter that will effectively and neatly cut an advancing web of polypropylene a great number of times without requiring reshaping or resetting of the blades.

Second, to provide a blade and blade mount for a rotating cutter that is relatively easy to adjust to cutting position.

Third, to provide a blade and blade mount for a rotating cutter that is particularly effective in cutting cast polypropylene films.

Other objects and advantages of the invention will be apparent from a consideration of the following description and claims. The drawings, of which there is one sheet, illustrate a highly practical form of the cutter and blade and blade mount of the invention.

FIG. 1 is a fragmentary side elevational view of a rotary cutter to which the invention is applicable.

FIG. 2 is a fragmentary end elevational view of the rotating and fixed blades and blade carriers of the cutter with the blades and blade mounts of the invention in operative position thereon.

FIG. 3 is a fragmentary side elevational view of blades and blade carriers with the rotating carrier and blade rotated to noncutting position.

FIG. 4 is a fragmentary side elevational view similar to FIG. 3 with the rotating blade rotated into cutting position.

FIG. 5 is a fragmentary cross sectional view taken along the plane of the line 5—5 in FIG. 4.

FIG. 6 is a fragmentary cross sectional view taken along the plane of the line 6—6 in FIG. 4.

Rotary cutters for paper and other web-like materials are well known. These have a rotating carrier on which is mounted a relatively thick and rigid blade ground to a straight rectangular edge. The carrier is mounted to rotatably swing the edge of the rotating blade in close, barely clearing, relation across the edge of a similar but fixed thick and rigid blade. The material to be cut is advanced between the blades while they are separated and when the rotating blade closes on the fixed blade the material is cut, or more accurately clipped off, due to the lack of clearance between the blades for the thickness of the material. These old cutters have proved ineffective for neat and prolonged cutting of synthetic cast polypropylene films.

Cast polypropylene films are formed by running, extruding, or "casting" the material of the film in liquid form onto a rotating chilled drum on which the liquid is spread to the desired thickness and solidified into the finished web. The web is drawn off of the roll with a tension that stretches the web in one direction only. It is a characteristic of these uni-axially stretched "cast" polypropylene films that a sharp blow, such as is applied by the thick blades of the old style cutters, locally toughens the film. The result has been that the old style cutters had to be reset and resharpened frequently to prevent ragged and incomplete cuts of the cast polypropylene films. A cutter assembled according to the disclosure of this application has made over 400,000 clean cuts of a cast polypropylene film and still showed no need for sharpening or resetting.

FIG. 1 illustrates generally a web cutter having supporting frame members 1 with coacting feed rolls 2 for delivering the web 3 over a fixed knife blade 4 and support 5. A rotating carrier 6 has a support 7 for a rotating knife blade 8. The rotating carrier is rotated at the desired time by mechanism which forms no part of the invention and so is not illustrated. A belt or other delivery means 9 picks up the leading end of the web and carries away the sheets severed by the blades.

The rotatable carrier 6 has a central drive shaft 10 with an abutment 11 projecting from one side thereof to a flat chordal surface 12. Segmental arcuate ribs 14 spaced along the shaft and connected by a flange 15 hold the web 3 down as it is passing the carrier. A radially projecting abutment rib 16 positioned midway of the chordal surface 12 assists in setting the knife blade 8 as will be described.

Seated against the chordal surface 12 is a relatively thick and rigid backing plate 17 that extends longitudinally along the carrier. The backing plate has an outwardly projecting shoulder 18 near its inner edge. This shoulder extends at a slight longitudinal angle with respect to the edges of the plate and the axis of the shaft 10.

The rotating blade 8 is a strip of relatively thin and flexible spring steel. At its rear or inner edge it abuts against the shoulder 18. The outer edge of the blade is ground straight and perpendicular to the flat side of the blade and projects in unsupported relation beyond the outer edge of the backing plate. A heavier, more rigid cap plate 19 is lapped on the outer side of the blade 8 and projects over the inner portion of the backing plate and the shoulder 18. Cap screws 20 are passed through the cap plate 19, blade 8 and backing plate 17 into holes tapped in the abutment 11. Sufficient clearance is left around the cap screws in the backing plate and blade to permit adjustment of the blade 8 on the carrier 6.

To facilitate accurate adjustment of the blade 8 and backing plate 17, screws 21 are threaded through the radial abutment 16 at spaced points along its length to abut at their inner ends against the back edge of the backing plate 17. Lock nuts 22 secure the screws 21 in their adjusted position. It will be apparent that adjustment of the screws will determine the angle at which the outer edge of the blade 8 is positioned. If desired, the angled position of the shoulder 18 on the backing plate may be omitted. The blade and its backing plate and cap plate are finally clamped in position by the cap screws 20.

The rotating blade cooperates with the fixed blade 4 on the support 5. The blade 4 is also of relatively thin and flexible spring steel and is supported upon an adjustably fixed backing plate 23 of relatively thick and rigid material. A shoulder 24 on the backing plate locates the blade and a lower cap plate 25 secured by the cap screws 26 clamps the blade in place. The blade 4 has a projecting unsupported edge extending beyond the backing plate that is ground straight and perpendicular to the sides of the blade. The edge is continuous when a complete cut across the web is desired.

The blades 4 and 8 are adjusted as is shown more clearly in FIGS. 4, 5 and 6. The cutting edge of the fixed blade 4 is parallel to the axis of rotation of the shaft and carrier 10. The cutting edge of the rotating blade 8 is askew to the same axis but lies at approximately the same radius from the axis of the shaft 10 throughout its length. This is accomplished by forming the surface 12 of the abutment 11 at a very slight longitudinal angle of about one quarter of one degree from a plane passed through one end of the surface 12 and parallel to the axis of the shaft 10. This results in one (the left) end of blade 8 trailing angularly slightly behind the other end so that when the blades are brought into registry, the right ends of the blades barely touch or overlap in closely adjacent edge to edge relation at 27. The other ends of the blades are spaced angularly somewhat as at 28. With blades fourteen inches long, the off-set of blade 8 at one end of the order of one sixteenth of an inch when the blades are of one thirty-second of an inch thick and formed of spring steel. These dimensions can, of course, vary somewhat depending on the length, thickness and flexibility of the blades. The adjustment is made with the screws 20, 21 and 22 so as to first grip one edge of the web between the askew edges of the blades, after which the edge of the rotating blade slides over the fixed blade in a progressive shearing action that provides a clean sharp cut across the web. The blades may be adjusted to practically zero clearance at each end and room for the thickness of the web at laterally uncut portions of the web is accommodated by flexing of the blades. The portion of the web that is sheared is not struck a sharp blow and even the cast polypropylene cuts smoothly and is not locally hardened or torn.

The films which are cut by the blades are from .00087 to .0015 of an inch thick and it is practically impossible to adjust a clearance between two rigid blades that will have, and hold, this tolerance from end to end. Cutting rates of 200 cuts per minute have been achieved with the arrangement of the invention and, as noted, over 400,000 cuts have ben made without requiring sharpening or adjustment of the blades. Blades arranged according to the invention as defined in the appended claims will also cut films other than the cast polypropylene for which they are particularly adapted so it is not necessary to provide different cutters for different films or webs.

It has been noted that with the arrangement illustrated, when the length of web fed between the blades between cutting cycles is greater than the circumference of the ribs 14, there is sometimes a tendency of the leading edge of the uncut web to be advanced into the notch between the blade 8 and the edge of the backing plate 17 and thus fail to enter into cutting position between the blades. This is a mechanical and timing problem caused by the blade 8 approaching cutting position at a slower rate than the infeeding web. If the feed rolls 2 and cutter 10 run continuously and the speed of the rolls 2 is changed to vary the length of the wrapper, the peripheral speed of the rotating blade 8 changes relative ot the lineal speed of the web during the cut so for sheets of longer lengths the web tends to overtake and catch in the back side of the rotating blades. However, such timing problems may be avoided by using a thick rotating blade such as are used on old cutters in the place of blade 8 to eliminate the notch behind the blade. This indicates that only one of the coacting blades needs to be thin and flexible as clean sharp cuts are obtained with one thick rigid blade and one thin flexible blade and the sharpness and setting of the blades remains effective approximately as long as when both blades are flexible.

What is claimed as new is:
1. A cut-off assembly for cutting traveling webs of synthetic film material comprising,
 a rotating carrier having segmental arcuate ribs spaced therealong with a flat abutment surface arranged chordally therebetwen and at a longitudinal angle of the order of one quarter of a degree with respect to the axis of rotation of the carrier,
 an abutment projecting from said chordal surface and spaced from the edge of the surface,
 a rigid backing strip lapped against said chordal surface and within the cylinder of rotation of the edge of said surface and having an outwardly facing shoulder angled slightly longitudinally relative to the axis of the carrier,
 a rotating blade of relatively thin and flexible spring steel lapped upon said backing strip with its inner edge abutting said shoulder and with a straight outer edge projecting beyond the cylinder of rotation of said carrier at an equal distance at each end of the carrier,
 a cap plate lapped upon said blade in inwardly spaced relation to the outer edge of the blade,
 clamp screws passed freely through said blade and said backing strip and clamping the same to said chordal surface,
 adjusting screws engaged through said abutment and bearing adjustably against the inner edge of said backing strip,
 a fixed abutment extending longitudinally in spaced relation to said carrier,
 a second rigid backing strip lapped against said fixed abutment,
 a fixed blade of relatively thin flexible spring steel lapped against said second backing strip,
 a second cap plate lapped against said fixed blade,
 screws clamping said second cap plate and fixed blade to said fixed abutment with the outer edge of the fixed blade extending parallel to the axis of rotation of said carrier and approximately in the cylinder of rotation of the longitudinally angled edge of said rotating blade whereby said rotating blade first makes a wiping edge to edge contact with said fixed blade at the lowest most angularly advanced end and slips progressively thereover by rotation of said rotating blade,
 and means for delivering a web to be cut to between said carrier and said fixed blade.

2. A cut-off assembly for cutting traveling webs of synthetic film material comprising,
 a rotating carrier having segmental arcuate ribs spaced therealong with a flat abutment surface arranged chordally therebetween and at a slight longitudinal angle with respect to the axis of rotation of the carrier,
 an abutment projecting from said chordal surface and spaced from the edge of the surface,
 a rigid backing strip lapped against said chordal surface and within the cylinder of rotation of the edge of said surface,
 a rotating blade of relatively thin and flexible spring steel lapped upon said backing strip with a straight outer edge projecting beyond the cylinder of rotation of said carrier at an equal distance at each end of the carrier,
 a cap plate lapped upon said blade in inwardly spaced relation to the outer edge of the blade,
 clamp screws passed freely through said blade and said backing strip and clamping the same to said chordal surface,
 adjusting screws engaged through said abutment and bearing adjustably against the inner edge of said backing strip,
 a fixed abutment extending longitudinally in spaced relation to said carrier,
 a second rigid backing strip lapped against said fixed abutment,
 a fixed blade of relatively thin flexible spring steel lapped against said second backing strip,
 a second cap plate lapped against said fixed blade,
 screws clamping said second cap plate and fixed blade to said fixed abutment with the outer edge of the fixed blade extending parallel to the axis of rotation of said carrier and approximately in the cylinder of rotation of the longitudinally angled edge of said rotating blade whereby said rotating blade first makes a wiping edge to edge contact with said fixed blade and slips progressively thereover by rotation of said rotating blade and flexing of the blades,
 and means for delivering a web to be cut to between said carrier and said fixed blade.

3. A cut-off assembly for cutting traveling webs of synthetic film material comprising,
 a rotating carrier having a flat longitudinal surface arranged chordally and at a slight longitudinal angle with respect to the axis of rotation of the carrier,
an abutment projecting from said chordal surface and spaced from the edge of the surface,
a rigid backing strip lapped against said chordal surface,
a rotating blade of relatively thin and flexible spring steel lapped upon said backing strip with a straight outer edge projecting beyond the cylinder of rotation of said carrier at approximately the same distance from one end of the carrier to the other,
a cap plate lapped upon said blade in inwardly spaced relation to the outer edge of the blade,
clamp screws passed freely through said blade and said backing strip and clamping the same to said chordal surface,
adjusting screws engaged through said abutment and bearing adjustably against the inner edge of said backing strip,
a fixed abutment extending longitudinally in spaced relation to said carrier,
a second rigid backing strip lapped against said fixed abutment,
a fixed blade of relatively thin flexible spring steel lapped against said second backing strip,
a second cap plate lapped against said fixed blade,
screws clamping said second cap plate and fixed blade to said fixed abutment with the outer edge of the fixed blade extending parallel to the axis of rotation of said carrier and approximately in the cylinder of rotation of the angled edge of said rotating blade whereby said rotating blade first makes a wiping edge to edge contact with said fixed blade and slips progressively thereover by rotation of said rotating blade and flexing of the blades,
and means for delivering a web to be cut to between said carrier and said fixed blade.

4. A cut-off assembly for cutting traveling webs of synthetic film material comprising,
a rotating carrier having a flat longitudinal surface extending substantially continuously from end to end thereof and arranged generally chordally and at a slight longitudinal angle with respect to the axis of rotation of the carrier,
a rigid backing strip lapped against said chordal surface,
a rotating blade of relatively thin and flexible material lapped upon said backing strip with a straight outer edge projecting beyond the cylinder of rotation of said carrier at approximately the same distance from one end of the carrier to the other,
a cap plate lapped upon said blade in inwardly spaced relation to the outer edge of the blade,
clamp screws passed freely through said blade and said backing strip and rigidly clamping the same to said chordal surface,
a fixed abutment extending longitudinally in spaced relation to said carrier,
a second rigid backing strip lapped against said fixed abutment,
a fixed blade of relatively thin flexible material having a straight outer edge and lapped against said second backing strip,
a second cap plate lapped against said fixed blade,
screws rigidly clamping said second cap plate and fixed blade to said fixed abutment with the outer edge of the fixed blade extending parallel to the axis of rotation of said carrier and approximately in the cylinder of rotation of the edge of said rotating blade whereby said rotating blade first moves into narrow side to side relation at their edges with said fixed blade at one end and slips progressively thereover by rotation of said rotating blade and flexing of the blades,
and means for delivering a web to be cut to between said carrier and said fixed blade, said blades being substantially coextensive longitudinally of said surface.

5. A cut-off assembly for cutting traveling webs comprising,
a rotating carrier having a flat longitudinal surface extending substantially continuously from end to end thereof and arranged generally chordally and at a slight longitudinal angle with respect to the axis of rotation of the carrier,
a rotating blade of relatively thin and flexible material supported upon said chordal surface with a straight outer edge projecting beyond the cylinder of rotation of said carrier at approximately the same distance from one end of the carrier to the other,
means rigidly clamping said blade to said chordal surface,
a fixed abutment extending longitudinally in spaced relation to said carrier,
a fixed blade of relatively thin flexible material having a straight outer edge and supported on said fixed abutment,
means rigidly clamping said fixed blade to said fixed abutment with the outer edge of the fixed blade extending parallel to the axis of rotation of said carrier and approximately in the cylinder of rotation of the angled edge of said rotating blade whereby said rotating blade first makes a narrow side to side lapped contact with said fixed blade at one end of the blades and slips progressively thereover by rotation of said rotating blade and flexing of the blades,
and means for delivering a web to be cut to between said carrier and said fixed blade, said blades being substantially coextensive longitudinally of said surface.

6. Web cutting means comprising,
an elongated rotatable carrier having a flat chordal surface extending substantially continuously from end to end thereof and,
a rotating blade of relatively thin and flexible spring steel material secured rigidly to said chordal surface and having a straight radially outer edge projecting in yieldable and laterally unsupported relation beyond said surface,
a fixed abutment extending generally parallel to the axis of said carrier,
a second blade of relatively thin and flexible spring steel material having a straight outer edge and secured rigidly to said abutment and having a straight outer edge projecting in yieldable and laterally unsupported relation beyond said abutment to adjacent the path of rotation of the projecting edge of said rotating blade,
the outer edge of said rotating blade lying at a slight longitudinal angle and approximately equal radial relation to the axis of rotation of said carrier whereby said blades are moved into a narrow side to side relation at their edges at one end and slide yieldably over each other upon rotation of said carrier, said blades being substantially coextensive longitudinally of said surface.

7. Web cutting means comprising,
an elongated rotatable carrier having a flat chordal surface extending substantially continuously from end to end thereof and,
a rotating blade secured rigidly to said chordal surface and having a straight radially outer edge projecting beyond said surface,
a fixed abutment extending generally parallel to the axis of said carrier,
a second blade secured rigidly to said abutment and having a straight outer edge projecting beyond said abutment to closely adjacent the path of rotation of the projecting edge of said rotating blade,
the outer edge of said rotating blade lying at a slight longitudinal angle and approximately equal radial relation to the axis of rotation of said carrier whereby said blades are moved first into a narrow side to side relation at their edges at one end of the blades,
one of said blades being relatively thin and flexible whereby they slide yieldably over each other upon rotation of said carrier, said blades being substantially coextensive longitudinally of said surface.

8. Web cutting means comprising,
an elongated rotatable carrier having a flat chordal surface extending substantially continuously from end to end thereof and,
a rotating blade secured rigidly to said chordal surface and having a straight radially outer edge projecting beyond said surface,
a fixed abutment extending generally parallel to the axis of said carrier,
a second blade secured rigidly to said abutment and having a straight outer edge projecting beyond said abutment to closely adjacent the path of rotation of the projecting edge of said rotating blade,
the outer edge of said rotating blade lying at a slight longitudinal angle and approximately equal radial relation to the axis of rotation of said carrier whereby said blades are moved into a narrow side to side relation at their edges at one end of the blades,
said blades being relatively thin and flexible whereby they slide yieldably over each other upon rotation of said carrier, said blades being substantially coextensive longitudinally of said surface.

9. Web cutting means comprising,
an elongated rotatable carrier having a flat chordal surface extending substantially continuously from end to end thereof and,
a rotating blade of relatively thin and flexible material secured rigidly to said chordal surface and having a straight radially outer edge projecting in yieldable and laterally unsupported relation beyond said surface,
a fixed abutment extending generally parallel to the axis of said carrier,
a second blade of relatively thin and flexible material secured rigidly to said abutment and having a straight outer edge projecting in yieldable and laterally unsupported relation beyond said abutment to closely adjacent the path of rotation of the projecting edge of said rotating blade,
the outer edge of one of said blades lying at a slight longitudinal angle and approximately equal radial relation from end to end to the axis of rotation of said carrier whereby said blades are moved first into a narrow side to side opposed relation at their edges at one end and slide yieldably over each other upon rotation of said carrier, said blades being substantially coextensive longitudinally of said surface.

10. Web cutting means comprising,
an elongated rotatable carrier having a flat chordal surface extending substantially continuously from end to end thereof and,
a rotating blade of thin flexible material secured rigidly to said chordal surface and having a straight radially outer edge projecting beyond said surface at approximately equal radius from end to end,
a fixed abutment extending generally parallel to the axis of said carrier,
a second blade secured rigidly to said abutment and having a straight outer edge projecting to closely adjacent the path of rotation of the projecting edge of said rotating blade,
the outer edge of said rotating blade lying at a slight longitudinal angle and approximately equal radius relative to the axis of rotation of said carrier whereby said blades are first moved into narrow side to side relation at their edges at one end and slide yieldably over each other upon rotation of said carrier, said blades being substantially coextensive longitudinally of said surface.

11. Web cutting means comprising,
an elongated rotatable carrier having a flat chordal surface extending substantially continuously from end to end thereof and,
a rotating blade secured rigidly to said chordal surface and having a straight radially outer edge projecting beyond said surface,
a fixed abutment extending generally parallel to the axis of said carrier,
a second blade secured rigidly to said abutment and having a straight outer edge projecting to closely adjacent the path of rotation of the projecting edge of said rotating blade,
the outer edge of one of said blades lying at a slight longitudinal angle and approximately equal radius from end to end relative to the axis of rotation of said carrier whereby said blades are moved first into narrow side to side relation at their edges at one end,
one of said blades being of relatively thin flexible material and laterally unsupported at its outer edge whereby the blades slide yieldably over each other upon rotation of said carrier, said blades being substantially coextensive longitudinally of said surface.

References Cited by the Examiner

UNITED STATES PATENTS

| | | | |
|---|---|---|---|
| 2,870,840 | 1/1959 | Kwitek | 83—349 |
| 3,030,841 | 4/1962 | Haas | 83—672 |
| 3,073,196 | 1/1963 | Marcalus | 83—341 |

FOREIGN PATENTS 752,051  7/1956  Great Britain.

WILLIAM W. DYER, JR., *Primary Examiner.*

ANDREW R. JUHASZ, *Examiner.*

J. L. SEITCHIK, L. B. TAYLOR, *Assistant Examiners.*